(12) United States Patent
Kuwamura et al.

(10) Patent No.: US 9,372,703 B2
(45) Date of Patent: *Jun. 21, 2016

(54) SIMULATION APPARATUS AND SIMULATION METHOD

(75) Inventors: Shinya Kuwamura, Kawasaki (JP); Atsushi Ike, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 782 days.

This patent is subject to a terminal disclaimer.

(21) Appl. No.: 13/617,828

(22) Filed: Sep. 14, 2012

(65) Prior Publication Data

US 2013/0096903 A1    Apr. 18, 2013

(30) Foreign Application Priority Data

Oct. 12, 2011    (JP) ................................. 2011-224714

(51) Int. Cl.
   *G06F 9/455*    (2006.01)
   *G06F 9/45*    (2006.01)

(52) U.S. Cl.
   CPC .  *G06F 9/455* (2013.01); *G06F 8/52* (2013.01)

(58) Field of Classification Search
   None
   See application file for complete search history.

(56) References Cited

U.S. PATENT DOCUMENTS

| 6,751,583 | B1 | 6/2004 | Clarke et al. | |
| 2008/0177527 | A1* | 7/2008 | Yoshinaga | G06F 9/455 703/26 |
| 2013/0047050 | A1* | 2/2013 | Kuwamura et al. | 714/746 |
| 2013/0227534 | A1* | 8/2013 | Ike et al. | 717/138 |

FOREIGN PATENT DOCUMENTS

| JP | H 11161692 A | 6/1999 |
| JP | H-11161692 A | 6/1999 |

OTHER PUBLICATIONS

Japanese Office Action issued Feb. 24, 2015; Japanese Application No. 2011-224714.
Ike, A. et al. "A Method of Fast Cycle Simulation for Embedded Systems", IPSJ SIG Technical Report 2010 (6), (DVD-ROM), vol. 2011-EMB-20, No. 27, pp. 1-6, Apr. 15, 2011.

* cited by examiner

*Primary Examiner* — Omar Fernandez Rivas
*Assistant Examiner* — Herng-Der Day
(74) *Attorney, Agent, or Firm* — Arent Fox LLP

(57) ABSTRACT

A simulation apparatus includes: operations of: dividing code of a program in a target processor into blocks; setting an execution result of an externally-dependant instruction depending on an external environment as a prediction result; carrying out function simulation based on the prediction result; calculating an execution time of the externally-dependant instruction according to instruction execution timing information and a function simulation result; generating host code which makes a host processor execute performance simulation based on the function simulation result: correcting the execution time of the externally-dependant instruction based on a delay time of the externally-dependent instruction and a execution time of an instruction executed before or after the externally-dependent function if an execution result of the externally-dependent function when the host processor executes the host code differs from the prediction result; and setting a corrected execution time of the external-dependent instruction as the execution time of the externally-dependant instruction.

9 Claims, 19 Drawing Sheets

MULT    r3,   r4,   (r5);      //r3 * r4 → r5

ADD     (r2,) (r5,)  r6;       //r2 + r5 → r6
```

FIG. 3

| INSTRUCTION | SOURCE REGISTER | DESTINATION REGISTER | PENALTY |
|---|---|---|---|
| LD | rs1:e1 | rd:e2 | CACHE MISS: 6 CYCLES |
| MULT | rs1:e1,rs2:e2 | rd:e3 | - |
| ADD | rs1:e1,rs2:e1 | rd:e2 | - |

FIG. 6

```
cache_id( address, rep_delay, pre_delay ) {
    avail_delay = 0;
    if(pre_delay < current_time - preid_time)
        avail_delay = pre_delay - current_time + preid_time;
    cache_lookup( address );
    if(cache_hit) {
        cache_update_onhit( address );
    } else {
        cache_update_onmiss( address );
        avail_delay += cache_miss_latency
        if(rep_delay < avail_delay)
            avail_delay -= avail_delay - rep_delay;
    }
    preid_time = current_time;
}
```

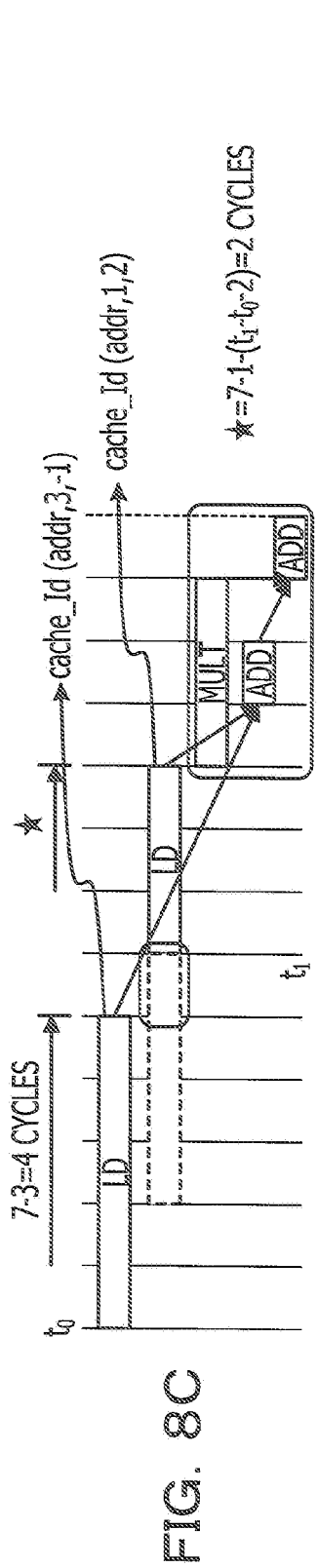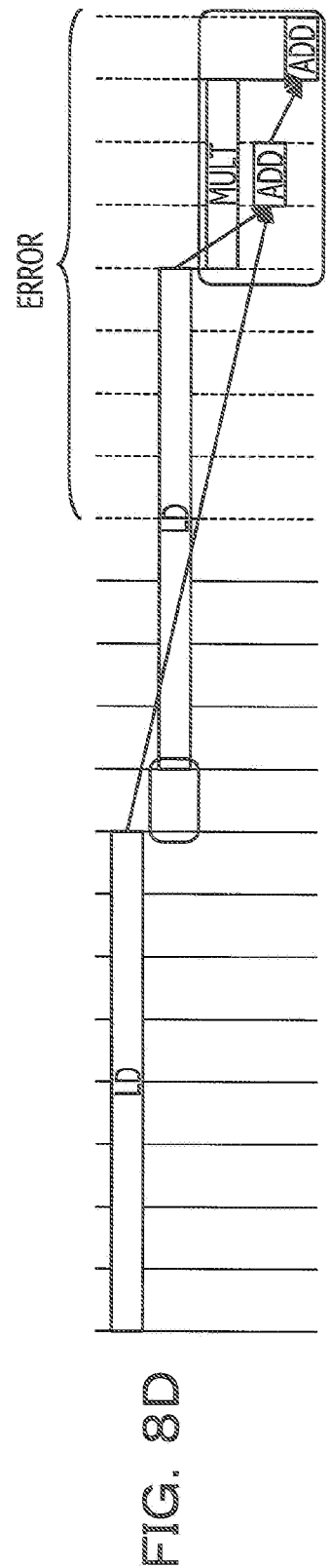

FIG. 13A
INSTRUCTION i0
INSTRUCTION i1
INSTRUCTION i2 (EXTERNALLY DEPENDENT INSTRUCTION)

FIG. 13B
HOST INSTRUCTION OF INSTRUCTION i0
PERFORMANCE CALCULATION INSTRUCTION 1 OF INSTRUCTION i0
PERFORMANCE CALCULATION INSTRUCTION 2 OF INSTRUCTION i0
PERFORMANCE CALCULATION INSTRUCTION 3 OF INSTRUCTION i0
HOST INSTRUCTION OF INSTRUCTION i1
PERFORMANCE CALCULATION INSTRUCTION 1 OF INSTRUCTION i1
PERFORMANCE CALCULATION INSTRUCTION 2 OF INSTRUCTION i1
PERFORMANCE CALCULATION INSTRUCTION 3 OF INSTRUCTION i1
HOST INSTRUCTION 1 OF INSTRUCTION i2
HOST INSTRUCTION 2 OF INSTRUCTION i2
PERFORMANCE CALCULATION INSTRUCTION OF INSTRUCTION i2
(HELPER FUNCTION)

FIG. 13C
HOST INSTRUCTION OF INSTRUCTION i0
HOST INSTRUCTION OF INSTRUCTION i1
HOST INSTRUCTION 1 OF INSTRUCTION i2
HOST INSTRUCTION 2 OF INSTRUCTION i2
PERFORMANCE CALCULATION INSTRUCTION 1 OF INSTRUCTIONS i0 AND i1
PERFORMANCE CALCULATION INSTRUCTION 2 OF INSTRUCTIONS i0 AND i1
PERFORMANCE CALCULATION INSTRUCTION 3 OF INSTRUCTIONS i0 AND i1
PERFORMANCE CALCULATION INSTRUCTION OF INSTRUCTION i2
(HELPER FUNCTION)

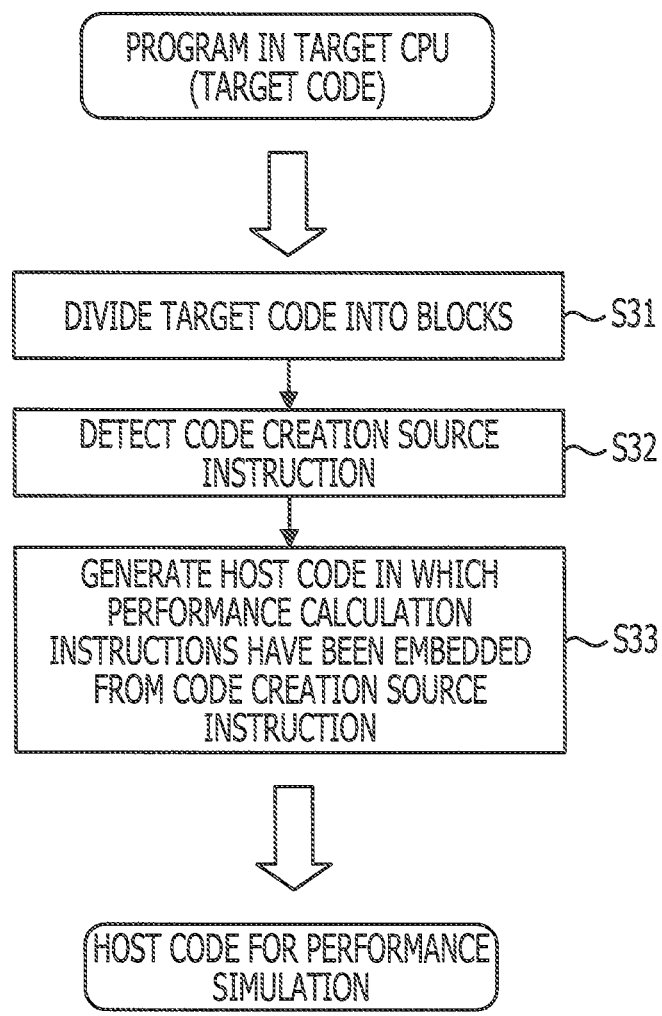

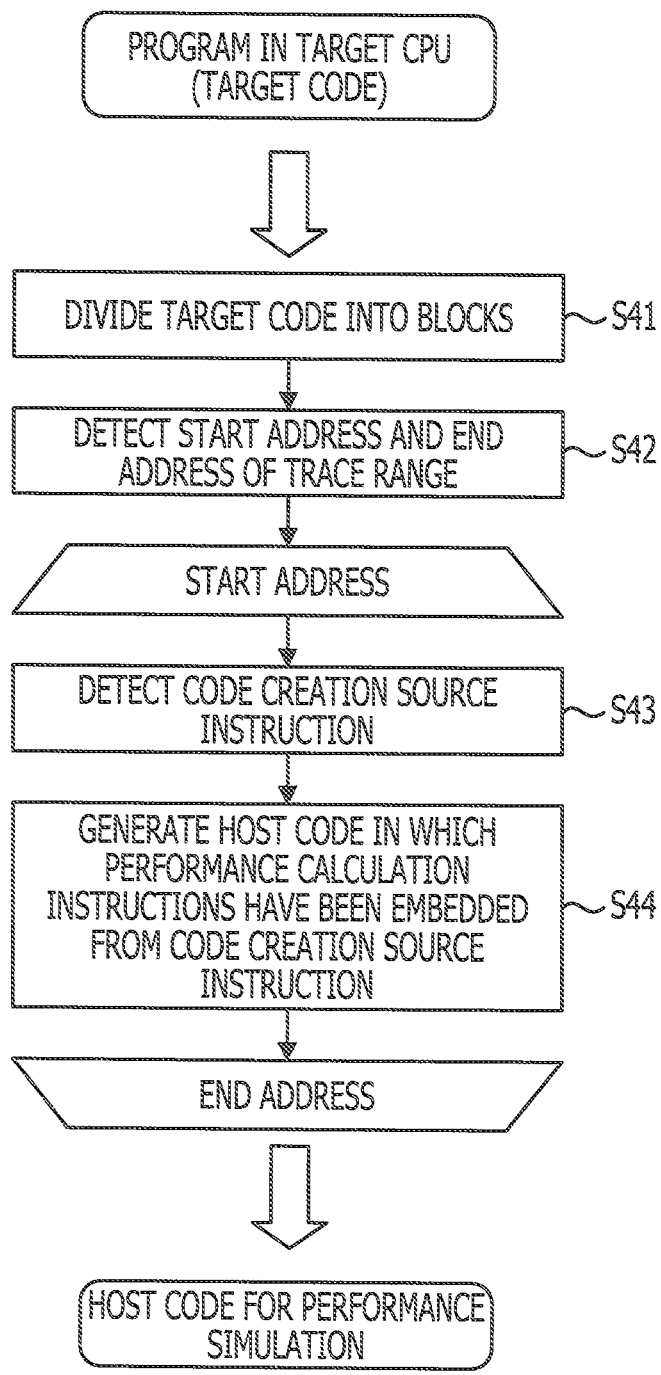

… # SIMULATION APPARATUS AND SIMULATION METHOD

CROSS-REFERENCE TO RELATED APPLICATION(S)

This application is based upon and claims the benefit of priority of the prior Japanese Patent Application No. 2011-224714, filed on Oct. 12, 2011, the entire contents of which are incorporated herein by reference.

FIELD

The embodiments discussed herein are related to processing technology that acquires simulation information about performance or electric power.

BACKGROUND

In a multi-core configuration in which a plurality of processors (central processing units (CPUs), for example) are mounted, simulation process is performed for functions, performance, electric power, or the like of each core (CPU), which has high processing speed or high processing precision.

A related technology is disclosed in U.S. Pat. No. 6,751,583 B1.

SUMMARY

According to one aspect of the embodiments, a simulation apparatus includes: a code converting part; and a simulation executing part, wherein the code converting part performs: dividing code of a program in a target processor which is controlled by a host processor into blocks; setting an execution result of an externally dependant instruction depending on an external environment included in a block as a prediction result; carrying out function simulation based on the prediction result; calculating an execution time of the externally dependant instruction under the prediction result according to instruction execution timing information included in the block and a function simulation result; and generating host code which makes the host processor execute performance simulation under the prediction result based on the function simulation result, wherein the simulation executing part performs: correcting the execution time of the externally dependant instruction by using a correction value based on a delay time of the externally dependent instruction and a execution time of an instruction executed before or after the externally dependent function if an execution result of the externally dependent function when the host processor executes the host code differs from the prediction result when the host processor executes the host code; and setting a corrected execution time of the external dependent instruction as the execution time of the externally dependant instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an exemplary instruction;
FIG. 3 illustrates exemplary timing information;
FIG. 6 illustrates an exemplary process of a correcting part;
FIGS. 8A to 8D illustrate an exemplary correction of a correcting part;
FIGS. 13A to 13C illustrate an exemplary relationship between an instruction in a target program and a number of host instructions in a host program.
FIG. 14 illustrates an exemplary process of a code converting part;
FIG. 15 illustrates an exemplary process of a code converting part.

DESCRIPTION OF EMBODIMENTS

As for a target CPU which is a simulation target for functions, performance, or power consumption, an instruction code of the target CPU (target code) in an operation as a host CPU is converted to instruction code of the host CPU (host code). In this conversion, an interpreter method or Just-in-time (JIT) compiler method may be used.

In simulation based on the MT compiler method, instructions of the target CPU, which appear in a program being executed, are replaced with instructions of the host CPU, which executes simulation. Therefore, processing in the JIT compiler method may be carried out faster than processing in the interpreter method.

When each unit operates independently for each clock, the internal state of the CPU changes each time processing is carried out in a control of a pipeline processing where entered instructions are executed concurrently. Accordingly, repeated use of generated host instructions, which is an advantage of the JIT compiler method, may be disabled.

When the interpreter method is used to simulate the functions, performance, or electric power of a CPU that controls pipeline processing or out-of-order processing, processing speed may become slow.

When the JIT compiler method is used to simulate performance or electric power, simulation code corresponding to a wide variety of internal states involved in control of pipeline processing may be added.

In performance simulation, a simulation code may be added to a host code to adapt to timings corresponding to delayed execution of the target CPU. When cycle simulation for a load (LD) instruction is to be executed, for example, conditional code may be added to the host code to check which of a cache miss or a cache hit occurs or to check whether there is a penalty cycle if a cache miss occurs.

Figure 1:
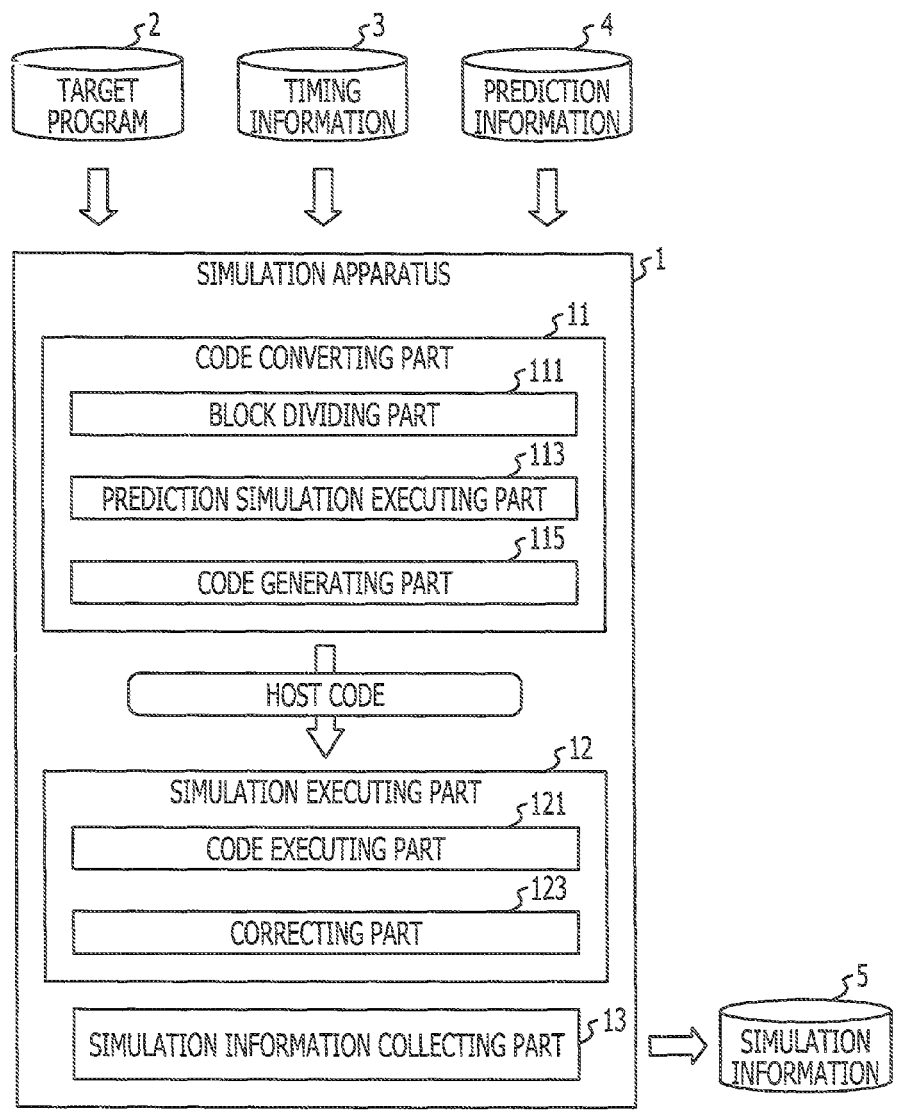
FIG. 1 illustrates an exemplary simulation apparatus.

FIG. 1 illustrates an exemplary simulation apparatus. The simulation apparatus 1 may execute performance simulation of instruction execution by a target CPU that controls pipeline processing.

The target CPU may be a control model for a CPU to be simulated. The simulation apparatus 1 outputs cycle simulation information of each instruction as a result of performance simulation of instruction execution by the target CPU.

The target CPU may be, for example, an ARM architecture CPU. The simulation apparatus 1 corresponding to the host CPU may be, for example, a computer in which an X86 architecture CPU is mounted.

The simulation apparatus 1 includes a code converting part 11, a simulation executing part 12, and a simulation information collecting part 13.

When a program of the target CPU is executed, the code converting part 11 generates a code of the host CPU that executes simulation, for example, a host code from a program code which is executed by the target CPU, for example, a target code.

The code converting part 11 includes a block dividing part 111, a prediction simulation executing part 113, and a code generating part 115.

The block dividing part 111 divides the target code of a program supplied to the simulation apparatus 1 into prescribed blocks. The prescribed block may be, for example, a basic block (code from a branch to a next branch) or a predetermined arbitrary code unit.

FIG. 2 illustrates an exemplary instruction. The instructions in FIG. 2 may be included in a block.

As illustrated in FIG. 2, the block includes three instructions as target code, "LD [r1], r2" (load), "MULT r3, r4, r5" (multiplication), and "ADD r2, r5, r6" (addition). For example, LD, MULT, and ADD are input to the pipeline of the target CPU in that order and are then executed. In these instructions, r1 to r6 indicate registers (addresses).

The prediction simulation executing part 113 receives timing information 3 and prediction information 4 and executes performance simulation on an entered block under a condition based on an execution result.

The timing information 3 includes information indicating, for each instruction in target code, correspondence between each processing (stage) in instruction execution and usable registers, and also includes, for each externally dependent instruction, a penalty time (a number of penalty cycles) corresponding to a delay time is determined according to an execution result.

Externally dependent instructions may include instructions involved in processing related to an external environment, instructions involved in processing in which execution results of a load instruction, a store instruction, and the like depend on the external environment outside the target CPU, such as a search processing of instruction caching, data caching, or translation look-aside buffer (TLB), and instructions for branch prediction and for stacking calls and returns.

FIG. 3 illustrates exemplary timing information. The timing information may be the timing information 3 illustrated in FIG. 1.

For the LD instruction in the timing information 3 in FIG. 3, the source register rs1 (r1) may be used by the first processing element (e1) and the destination register rd (r2) may be used by the second processing element (e2).

For the MULT instruction, the first source register rs1 (r3) may be used by the first element (e1), the second source register rs2 (r4) may be used by the second element (e2), and the destination register rd (r5) may be used by the third processing element (e3). For the ADD instruction, the first source register rs1 (r2) and the second source register rs2 (r5) may be used by the first element (e1) and the destination register rd (r6) may be used by the second processing element (e2).

Figure 4A:
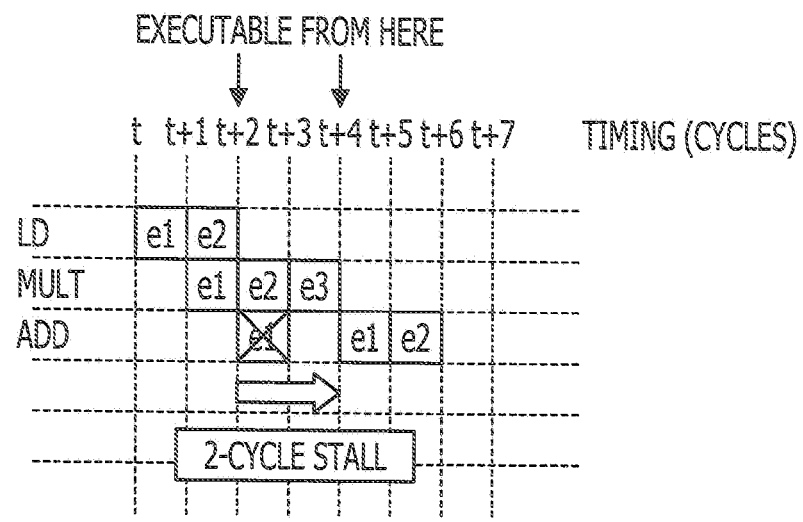
FIGS. 4A and 4B illustrate an exemplary execution timing of an instruction.
Figure 4B:
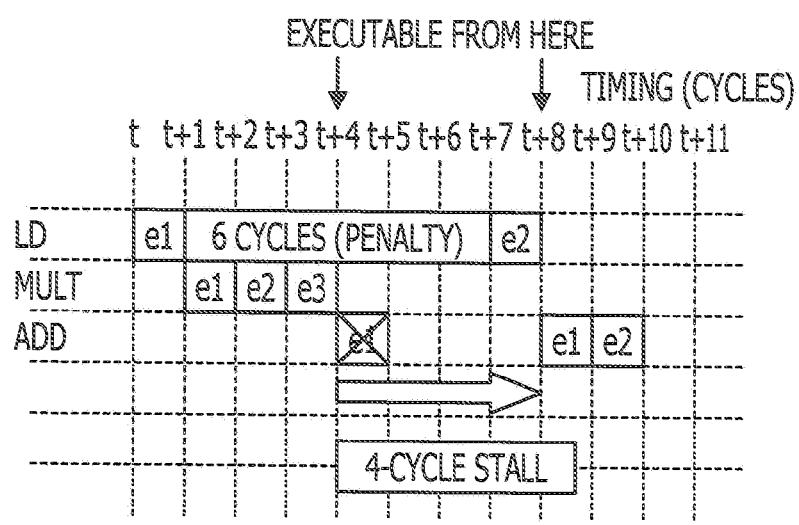

FIGS. 4A and 4B illustrate an exemplary execution timing of an instruction. The execution timings in FIGS. 4A and 4B may be timings at which the instructions in the block illustrated in FIG. 2 are executed.

If execution of the LD instruction starts at timing t, for example, the MULT instruction is entered into the pipeline at timing t+1 and the ADD instruction is entered into at timing t+2 according to the timing information 3 in FIG. 3.

Since the first source register (r2) and second source register (r5) in the ADD instruction are used by the LD instruction and MULT instruction, execution of the ADD instruction starts after timing t+4, at which execution of the LD instruction and MULT instruction has been completed, thereby generating a wait time equivalent to two cycles (two-cycle stall).

Accordingly, when the block in FIG. 2 is simulated, if the execution result of the LD instruction is a cache hit, the execution time of the block may be six cycles as illustrated in FIG. 4A.

FIG. 4B is a timing diagram when the execution result of the LD instruction in the block in FIG. 2 is a cache miss.

If the execution result of the LD instruction is a cache miss, a time period for re-execution, for example, penalty cycles corresponding to six cycles, are added to the timing information 3 as a delay time. Accordingly, execution of the second processing element (e2) is delayed to timing t+7. Although the MULT instruction, which is executed after the LD instruction, is executed without being affected by the delay, execution of the ADD instruction starts after timing t+8, at which execution of the LD instruction has been completed, thereby generating a wait time equivalent to four cycles (four-cycle stall).

Accordingly, when the instructions in the block in FIG. 2 are simulated, if the execution result of the LD instruction is a cache miss, the execution time may be 10 cycles as illustrated in FIG. 4B.

The prediction information 4 defines execution results (prediction results) that are highly likely to be generated in processing of an externally dependent instruction in the target code. For example, the prediction information includes the following, for example.

Instruction cache: prediction=hit
Data cache: prediction=hit
TLB search: prediction=hit
Branch prediction: prediction=hit
Call or return: prediction=hit The prediction simulation executing part 113 sets a prediction result of an externally dependent instruction included in entered block according to the prediction information 4. The prediction simulation executing part 113 executes an instruction under a condition on the premise of the execution result (a predictive case) with reference to the timing information 3 and simulates instruction execution. The prediction simulation executing part 113 outputs the execution time (number of cycles used) taken by each instruction in the block as a simulation result.

The code generating part 115 generates host code used to carry out performance simulation at the time of instruction execution in the set predictive case (the host code is referred to as host code for performance simulation) as host code corresponding to the processed block, according to the simulation result obtained from the prediction simulation executing part 113.

The code generating part 115 generates host code by which the externally dependent instruction executes an instruction in the predictive case corresponding to the prediction result, according to the target code in the block, adds the execution times of the instructions, and embeds simulation code for calculating a time taken to process the block.

For example, for processing where a cache hit has been set as a prediction result of the LD instruction in data, the code generating part 115 simulates processing when access of the LD instruction in the block to the cache results in a hit. An execution time in the predictive case is obtained. A host code for obtaining an execution time taken when access of the LD instruction in the block to the cache results in a miss from a correction calculation which uses an addition or a subtraction deletion of an execution time at the time of a hit in the predictive case is generated.

The simulation executing part 12 executes the host code generated by the code generating part 115 and simulates the functions and performance of instruction execution by the target CPU, which executes a program (target code).

The simulation executing part 12 includes a code executing part 121 and a correcting part 123.

The code executing part 121 uses the host code to execute a program (target code).

If the execution result of the externally dependent instruction is different from the prediction result (non-predictive case) during program execution, the correcting part 123 obtains an instruction execution time by correcting the execution time that has been already obtained in the predictive case.

The correcting part 123 uses a penalty time given to the externally dependent instruction, execution times taken by instructions before and after the externally dependent instruction, a delay time of the preceding instruction, or the like to perform correction.

The simulation information collecting part 13 collects log information (simulation information) 5, which includes execution times of instructions, as execution results of performance simulation.

Code Conversion Processing (1) The block dividing part 111 in the code converting part 11 in the simulation apparatus 1 obtains the target code of a target program 2, stores the target code in a storage unit (not illustrated), and divides the stored target code into blocks.

(2) The prediction simulation executing part 113 obtains the timing information 3 and prediction information 4 about the target program 2 to be input and stores the timing information 3 and prediction information 4 in the storage unit.

The prediction simulation executing part 113 sets a prediction result for each externally dependent instruction in the divided blocks according to the prediction information 4. For example, the prediction simulation executing part 113 sets a hit as the prediction result of the access of the LD instruction, which is one of the block instructions illustrated in FIG. 2, to the data cache.

(3) The prediction simulation executing part 113 interprets the code in the block and simulates instruction execution based on the set execution result. For example, the prediction simulation executing part 113 simulates the execution of instructions for which timings have been set as in FIG. 4A.

(4) The code generating part 115 generates host code from the target code according to the simulation result in the predictive case. The code generating part 115 embeds code for cycle simulation, which is used to carry out performance simulation (cycle simulation), into the host code (function code) obtained by converting the target code.

Figure 5A:
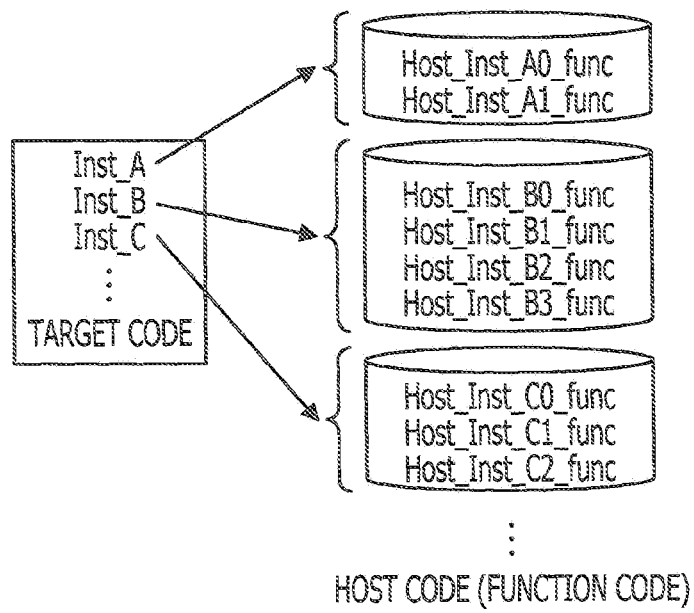
FIG. 5A illustrates an exemplary host code.
Figure 5B:
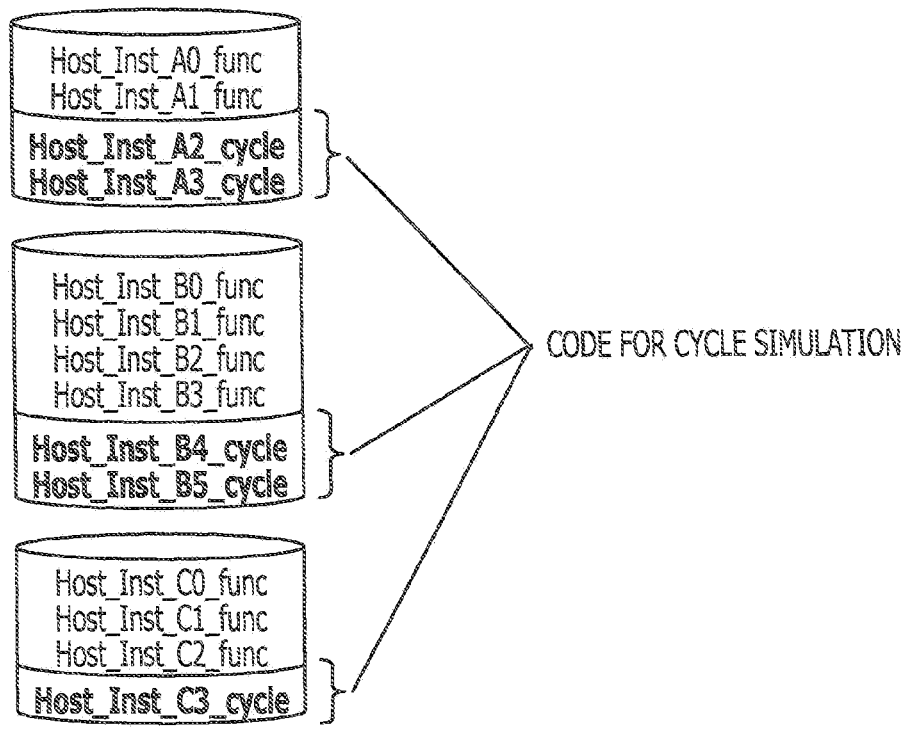
FIG. 5B illustrates an exemplary code for cycle simulation.

FIG. 5A illustrates an exemplary host code. In FIG. 5A, host code for function simulation is generated from the target code. FIG. 5B illustrates an exemplary code for cycle simulation. In FIG. 5B, code for cycle simulation is embedded into the host code for function simulation.

As illustrated in FIG. 5A, target code Inst_A is converted to host code Host_Inst_A0_func and Host_Inst_A1_func, and target code Inst_B is converted to host code Host_Inst_B0_func, Host_Inst_B1_func, Host_Inst_B2_func, and so on. Accordingly, the host code including only function code is generated.

Code for cycle simulation Host_Inst_A2_cycle and code for cycle simulation Host_Inst_A3_cycle in target code Inst_A are embedded into host code including only function code. Similarly, code for cycle simulation Host_Inst_B4_cycle and code for cycle simulation Host_Inst_B5_cycle in target code Inst_B are embedded into host code including only function code.

The code for cycle simulation is for obtaining a processing time of the block by representing the execution times (number of cycles used) of instructions as constants and adding the execution times of the instructions. Thus, information indicating the progress of block execution is obtained.

Of the host code, function code and code for cycle simulation of instructions other than externally dependent instructions may be known code. Code for cycle simulation of an externally dependent instruction may be prepared as a helper function that calls correction processing.

Simulation Processing (1) The code executing part 121 in the simulation executing part 12 uses the host code generated by the code converting part 11 to simulates the performance of the target program 2.

The code executing part 121 simulates the execution of the instructions in the target program 2 and obtains execution times taken by the instructions.

(2) If the code executing part 121 detects an externally dependent instruction, for example, an LD instruction, during simulation, the code executing part 121 decides that the execution result differs from the prediction result. If the execution result differs from the prediction result, the code executing part 121 requests the correcting part 123 to be activated. For example, when instruction "LD [r1], r2" is detected and there may be a mismatch between the prediction result of access to the data cache (cache hit) and the execution result (cache miss), the correcting part 123 is called.

(3) When called, the correcting part 123 is activated and corrects the execution time (number of cycles) of the detected instruction "LD [r1], r2", The correcting part 123 may change the execution timing t+n of the next instruction.

The correcting part 123 corrects the execution time of an instruction each time the execution result of the externally dependent instruction differs from the prediction result. When the execution time of the externally dependent instruction in the predictive case is represented as a constant, the correcting part 123 calculates the execution time of the externally dependent instruction in the predictive case by adding or subtracting the penalty time of the externally dependent instruction, the execution times of instructions executed before and after the externally dependent instruction, or the delay time of the instruction executed before the externally dependent instruction, FIG. 6 illustrates an exemplary process of a correcting part.

The correcting part 123 is implemented as a helper function module.

For example, a helper function "cache_Id (address, rep_delay, pre_delay)" may be embedded into the host code instead of function "cache_Id (address)", which performs simulation for each execution result of access of the LD instruction to a cache, The value of rep_delay in the helper function may be a reprieve time that is part of the penalty time during which processing has not been executed as a delay time until a next instruction that uses a return value of the load (LD) instruction is executed. The value of pre_delay indicates a delay time received from the preceding instruction. When the value of pre_delay is −1, it indicates that the preceding instruction has no delay. Both rep_delay and pre_delay are time information obtained from the result of static analysis of the performance simulation result and timing information 3.

In FIG. 6, when the difference between the value of current_time, which indicates the current timing, and the value of preId_time, which indicates the execution timing of the preceding LD instruction exceeds the value of pre_delay, which indicates a delay of the preceding LD instruction, the correcting part 123 adjusts the delay time pre_delay by using the value of preId_time, which indicates the execution timing of the preceding LD instruction, and a time until the current timing current_time and obtains an available delay time avail_delay.

If the execution result is a cache miss, it indicates that the prediction result is wrong. Accordingly, the correcting part 123 adds the value of penalty time cache_miss_latency, which is taken when there is a cache miss, to the available delay time avail_delay and corrects the execution time of the LD instruction according to the reprieve time rep_delay.

FIGS. 7A to 7D, FIGS. 8A to 8D, and FIGS. 9A to 9D illustrate an exemplary correction of a correcting part. Correction in FIGS. 7A to 7D, FIGS. 8A to 8D, and FIGS. 9A to 9D may be correction carried by the correcting part 123 in FIG. 1 on the execution result of the LD instruction.

Figure 7A:
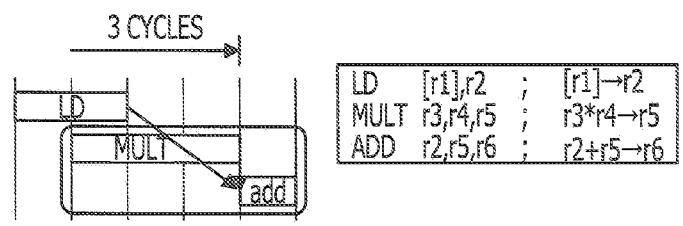
FIGS. 7A to 7D illustrate an exemplary correction of a correcting part.
Figure 7B:
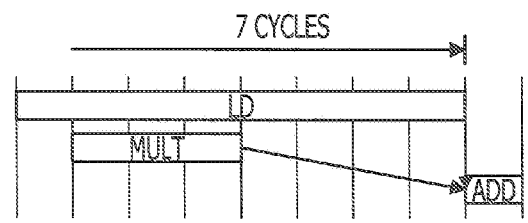
Figure 7C:
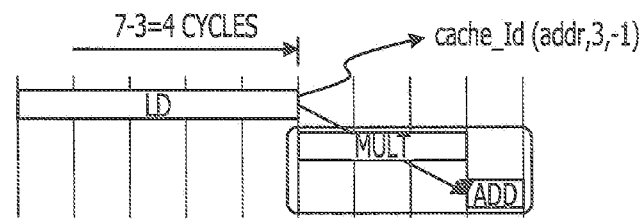

FIGS. 7A to 7C illustrate correction carried out when one cache miss occurs in a case in which one cache process is executed.

In FIGS. 7A to 7D, the three instructions listed below are simulated.

LD [r1], r2: [r1]→r2;
MULT r3, r4, r5: r3*r4→r5;
ADD r2, r5, r6: r2+r5→r6

FIG. 7A illustrates a timing diagram of instruction execution in which the prediction result is a cache hit. A two-cycle stall is generated for the ADD instruction executed as the third instruction.

FIG. 7B illustrates a timing diagram of instruction execution in which the result of the cache process is a cache miss, which differs from the prediction result. If the execution result of the LD instruction is a cache miss, a delay equivalent to penalty cycles (six cycles) is generated. Accordingly, the MULT instruction is executed without being affected by the delay, but the execution of the ADD instruction is awaited until the LD instruction has been executed and is thereby delayed by four cycles.

FIG. 7C illustrates a timing diagram of instruction execution after correction has been carried out by the correcting part 123.

Since the execution result of the LD instruction is a cache miss (the prediction result is wrong), the correcting part 123 obtains an available delay time (seven cycles) by adding a prescribed penalty time (six cycles) taken in the case of a cache miss to the remaining execution time (2−1=1 cycle). The available delay time may be the maximum possible delay time.

The correcting part 123 obtains the execution time (three cycles) of the next instruction, MULT, and decides that the execution time of the next instruction will not exceed the delay time. The correcting part 123 then subtracts the execution time of the next instruction from the available delay time to obtains the subtraction result (7−3=4 cycles) as a time (delay time) during which the delay of the LD instruction continued.

The correcting part 123 subtracts the above delay time from the available delay time and obtains the subtraction result (three cycles) as the reprieve time. The reprieve time may be a time during which a grace is given to a delay used as a penalty.

The correcting part 123 uses the helper function cache_Id (addr, rep_delay, pre_delay) to return 3 as the reprieve time rep_delay and return −1 (no delay) as the delay time pre_delay of the previous instruction.

As a result of correction, the execution time of the LD instruction is set to a time (1+4=5 cycles) obtained by summing the time taken for execution and the delay time, and the execution times of the subsequent instructions, MULT and ADD, are calculated from the timing $t_1$ at which execution has been completed.

The execution time (number of cycles) of the block is obtained by, for example, simply adding the execution time (three cycles) of the MULT instruction and the execution time (three cycles) of the ADD instruction to the corrected execution time (five cycles) of the LD instruction, the execution times of the MULT instruction and ADD instruction being obtained according to the processing result (prediction simulation result based on the prediction result) obtained from the prediction simulation executing part 113.

The number of execution cycles in simulation in the case of a cache miss is highly precisely obtained by correction including addition or subtraction of the execution time of an instruction having the execution result of which differs from the prediction result and by addition of an execution time obtained in simulation based on the prediction result.

Figure 7D:
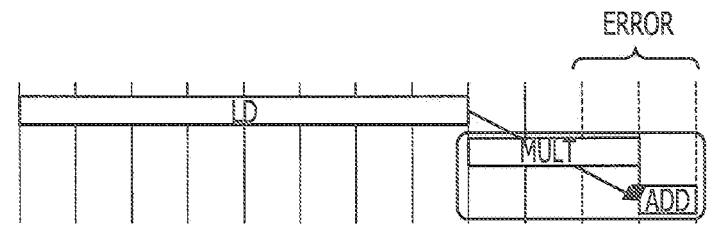

FIG. 7D illustrates error in the number of cycles in the case of a cache miss, the error being obtained by simple addition. In FIG. 7D, since the delay time of the LD instruction is added, error based on a shift of the execution timing of the MULT instruction, the execution of which is completed during the execution of the LD instruction, may occur.

Figure 8A:
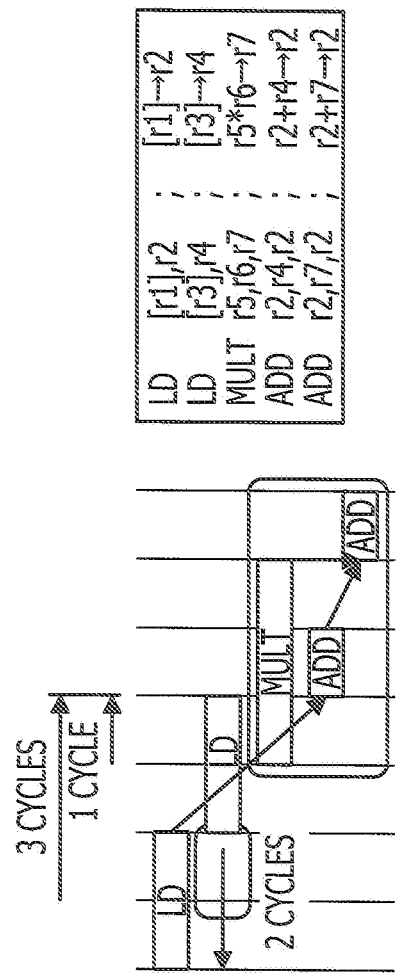
Figure 8B:
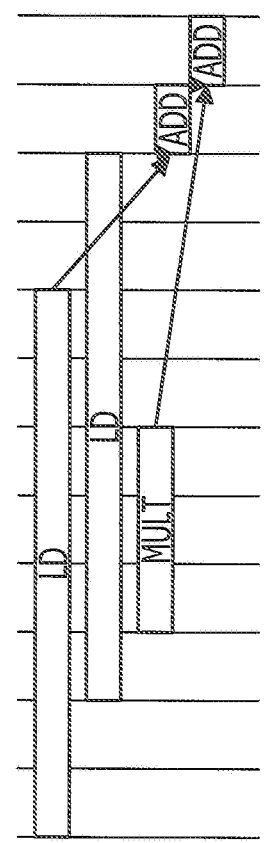

FIGS. 8A to 8C illustrate an exemplary correction of a correcting part. The correction illustrated in FIGS. 8A to 8C is carried out when two cache misses occur in a case in which two cache processes are executed.

In FIGS. 8A to 8D, the five instructions listed below are simulated.

LD [r1], r2: [r1]→r2;
LD [r3], r4: [r3]→r4;
MULT r5, r6, r7: r5*r6→r7;
ADD r2, r4, r2: r2+r4→r2;
ADD r2, r7, r2: r2+r7→r2;

FIG. 8A illustrates a timing diagram of instruction execution in which the prediction results in the two cache processes are each a cache hit. The two LD instructions are executed with an interval of two cycles (normal one cycle and added one cycle) provided therebetween.

FIG. 8B illustrates a timing diagram of instruction execution in which the results of the two cache processes are cache misses, which differ from the prediction result. Since each of the two LD instructions caused a cache miss, a delay corresponding to the penalty cycles (six cycles) is generated. Since the delay times of the two LD instructions overlap, the MULT instruction is executed without being affected by the delay. However, the execution of the two ADD instructions is delayed until the second LD instruction has been executed.

FIG. 8C illustrates a timing diagram of instruction execution after correction has been carried out by the correcting part 123.

The correcting part 123 corrects the delay time of the first LD instruction at timing $t_0$ and returns a helper function cache_Id (addr, 3, −1), as illustrated in FIG. 8C.

Since the execution result of the second LD instruction is a cache miss at the current timing $t_1$ (the prediction result is wrong), the correcting part 123 obtains an available delay time (1+6=7 cycles) by adding six penalty cycles to the remaining execution time of the LD instruction.

The correcting part 123 obtains an available delay time elapsed as an excess from the current timing $t_1$, three cycles (7−(6−2)=3), by subtracting a delay time consumed until the current timing $t_1$, the delay time being "(current timing $t_1$—execution timing $t_0$ of the previous instruction)—interval setting", from the available delay time. The available delay time that has been elapsed as an excess may be set as the execution time of the second LD instruction.

The correcting part 123 obtains the delay time of the previous instruction, "3−1=2 cycles", by subtracting the original execution time from the available delay time elapsed as an excess.

The correcting part 123 obtains a reprieve time, "7−(3+3)=1 cycle", by subtracting the sum of a delay time consumed until the current timing $t_1$ and the available delay time elapsed as an excess at the current timing $t_1$ from the available delay time.

The correcting part 123 corrects the delay time of the second LD instruction at timing $t_1$ and returns a helper function cache_Id (addr, 1, 2).

A timing obtained by adding a correction value (three cycles) to the current timing $t_1$ as correction is set as a timing at which execution of the LD instruction is completed. The execution times of the subsequent MULT instruction and ADD instruction is added from the timing.

FIG. 8D illustrates error in the number of cycles in the case of a cache miss, the error being obtained by simple addition. In FIG. 8D, since the delay times based on penalties given to the two LD instructions are added, error (nine cycles) may be caused. Although processing by the correcting part 123 illustrated in FIG. 8C has error (one cycle), the number of cycles in the case of a cache miss may be highly precisely obtained.

Figure 9A:
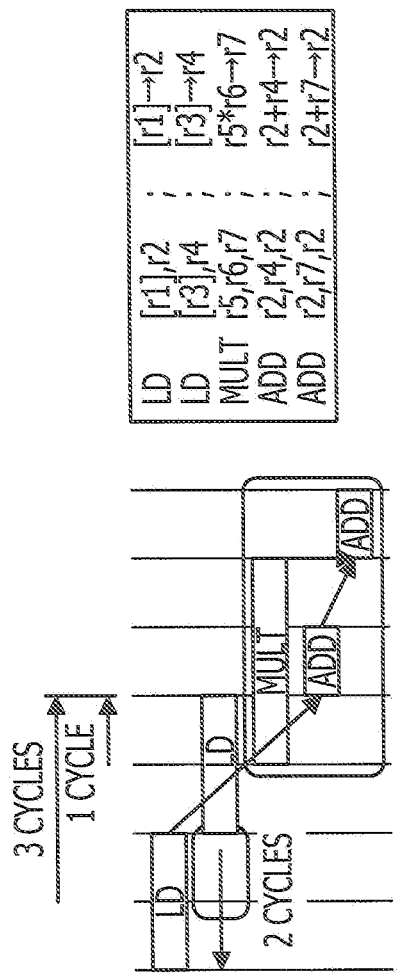
FIGS. 9A to 9D illustrate an exemplary correction of a correcting part.
Figure 9B:
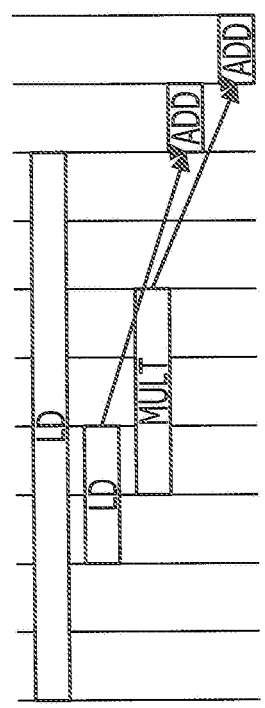
Figure 9C:
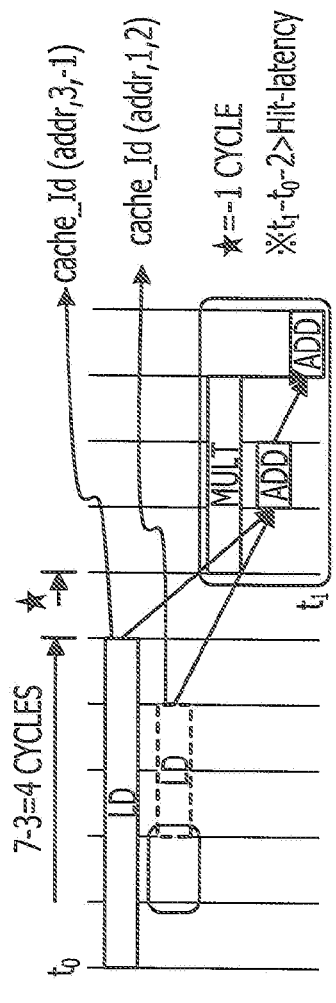

FIGS. 9A to 9C illustrate an exemplary correction of a correcting part. The correction illustrated in FIGS. 9A to 9C is carried out when one cache miss occurs in a case in which two cache processes are executed. In FIGS. 9A to 9D, five instructions are simulated as illustrated in FIGS. 8A to 8D.

FIG. 9A illustrates a timing diagram of instruction execution in which the prediction result in the two cache processes is a cache hit. The two LD instructions are executed with an interval of two cycles (normal one cycle and added one cycle) therebetween as in FIG. 8A.

FIG. 9B illustrates a timing diagram of instruction execution in which the execution result of the first LD instruction is a cache miss, which differ from the prediction result, and the execution result of the second LD instruction matches the prediction result (cache hit). Each of the two LD instructions may cause a delay equivalent to six penalty cycles. Since the delay times of the two LD instructions overlap, the MULT instruction is executed without being affected by the delay. However, the execution of the second ADD instruction may be delayed until the second LD instruction has been executed.

FIG. 9C illustrates a timing diagram of instruction execution after correction has been carried out by the correcting part 123.

The correcting part 123 corrects the delay time of the first LD instruction at timing $t_0$ and returns a helper function cache_Id (addr, 3, −1), as illustrated in FIG. 9C.

Since the execution result of the second LD instruction is a cache hit at the current timing $t_1$ (as indicated by the prediction result), the correcting part 123 decides whether a time from the start of execution of the second LD instruction to the current timing $t_1$, "$t_1 - t_0$—interval setting (6−0−2=4 cycles)", is longer than the execution time (2 cycles) of the LD instruction.

Since the time from the start of execution of the second LD instruction to the current timing $t_1$ is longer than the execution time (2 cycles) of the LD instruction, the correcting part 123 takes the current timing $t_1$ as the execution timing of the next instruction, MULT.

The correcting part 123 handles a time from the completion of execution of the second LD instruction to the current timing $t_1$, two cycles, as a delay time for the next instruction, and sets the delay time pre_delay of the previous instruction to 2. The correcting part 123 subtracts the sum of a delay time consumed until the current timing $t_1$ and the available delay time elapsed as an excess at the current timing $t_1$ from the available delay time of the first LD instruction, "7−(6+0)=1 cycle", and sets the reprieve rep_delay to 1, after which the correcting part 123 returns a helper function cache_Id (add, 1, 2).

Figure 9D:
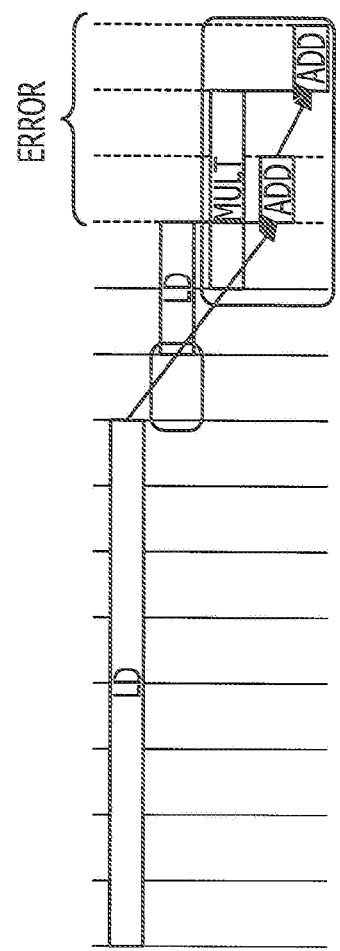

FIG. 9D illustrates error in the number of cycles in the case of a cache miss, the error being obtained by simple addition. In FIG. 9D, since the delay time based on a penalty given to the first LD instruction is added, an error may be caused.

Figure 10:
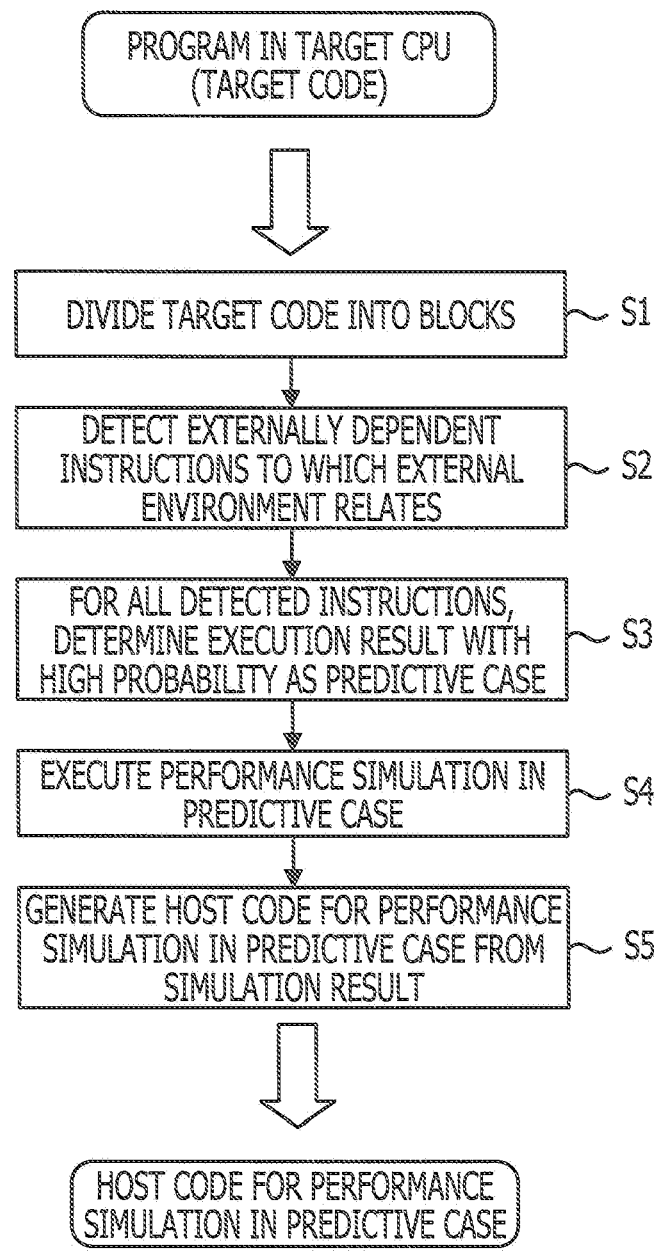
FIG. 10 illustrates an exemplary process of a code converting part.

FIG. 10 illustrates an exemplary process of a code converting part. The code conversion processing in FIG. 10 may be executed by the code converting part 11 in the simulation apparatus 1 in FIG. 1.

The block dividing part 111 in the code converting part 11 in the simulation apparatus 1 divides the code of a target program (target code) into prescribed blocks and inputs the divided blocks (operation S1).

The prediction simulation executing part 113 analyzes the instructions in each block and detects externally dependent instructions (operation S2). For all detected instructions, an execution result having a high probability is determined as a predictive case according to the prediction information 4 (operation S3).

The prediction simulation executing part 113 references the timing information 3 and executes performance simulation based on the execution result set as the prediction result for all instructions in the block (operation S4).

The code generating part 115 generates host code for performance simulation from the simulation result, the host code being executed by the simulation executing part 12 (operation S5).

As a result of processing in operations S1 to S5, host code in which code used to simulate the performance of the target CPU has been embedded into the function code in the set execution result (predictive case) is output.

Figure 11:
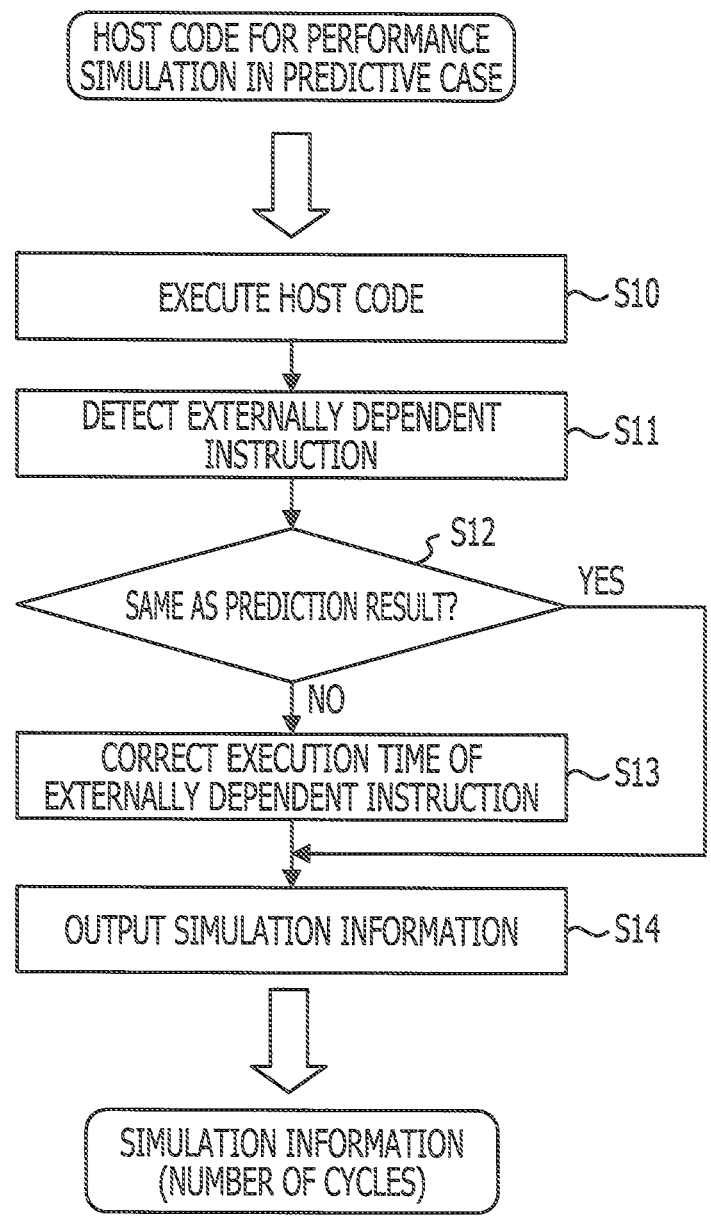
FIG. 11 illustrates an exemplary simulation.

FIG. 11 illustrates an exemplary simulation. The simulation in FIG. 11 may be executed by the simulation executing part 12 in the simulation apparatus 1 illustrated in FIG. 1.

The code executing part 121 in the simulation executing part 12 in the simulation apparatus 1 executes the host code generated by the code generating part 115 and carries out performance simulation (operation S10). If the code executing part 121 detects an externally dependent instruction during execution (operation S11), the code executing part 121 decides whether the execution result of the externally dependent instruction is the same as the prediction result (operation S12). If the execution result of the externally dependent instruction is not the same as the prediction result (the result of operation S12 is No), the correcting part 123 is called to correct the execution time of the externally dependent instruction (operation S13).

The simulation information collecting part 13 outputs simulation information 5 of simulation of all host code corresponding to the target program (operation S14).

As a result of processing in operations S10 to S14, the simulation information (cycle simulation information) 5 about the target CPU that executes the target program 2 is output.

Figure 12:
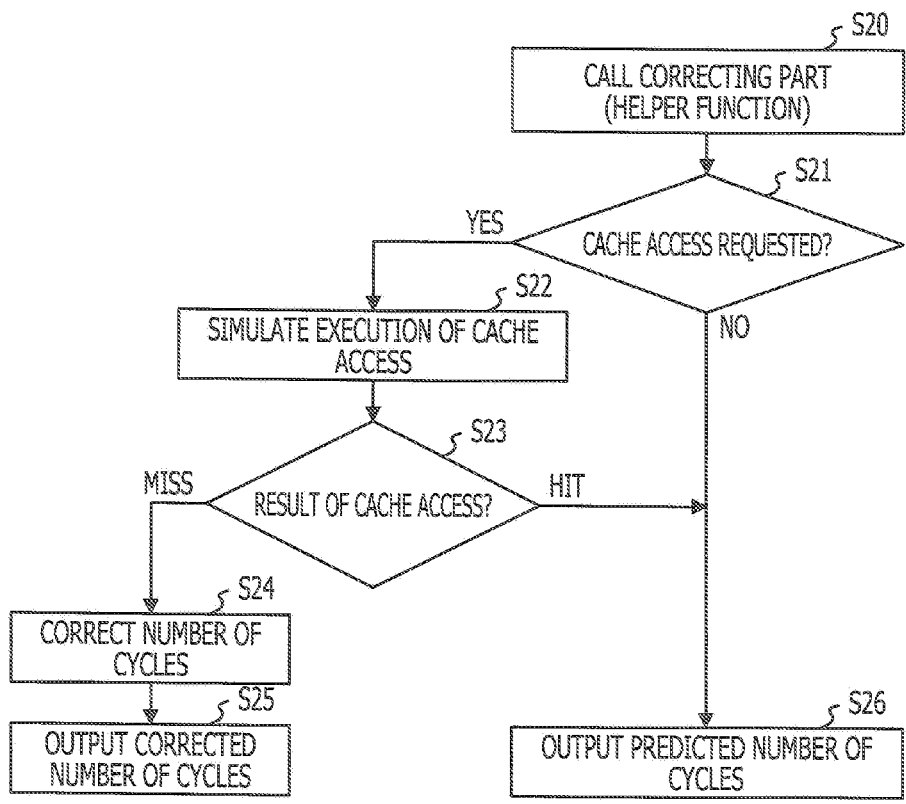
FIG. 12 illustrates an exemplary externally dependent instruction.

FIG. 12 illustrates an exemplary externally dependent instruction. In FIG. 12, decision processing and correction processing for the prediction result of a load (LD) instruction are illustrated.

Upon detection of an externally dependent instruction from instructions in a block that is being processed, the code executing part 121 calls a helper function corresponding to the correcting part 123 (operation S20).

The code executing part 121 decides whether the LD instruction is requesting cache access (operation S21). If cache access is being requested (the result in operation S21 is Yes), the code executing part 121 simulates cache access (operation S22). If the result of cache access is a cache miss (the result in operation S23 is "miss"), the correcting part 123 corrects the execution time (number of cycles) of the LD instruction (operation S24), and outputs a corrected execution time (number of cycles) (operation S25).

If cache access is not being requested in operation S21 (the result in operation S21 is No) or the requested cache access results in a cache hit (the result of operation S23 is "hit"), the correcting part 123 outputs the predicted execution time (number of cycles), which is left uncorrected (operation S26).

The code converting part 11 in the simulation apparatus 1 detects an externally dependent instruction from the target code and generates code, for performance simulation, that includes a host instruction for calling a helper function. For example, the code converting part 11 generates known host code for performance calculation in response to an instruction other than the externally dependent instruction in the target code. The known host code for performance calculation may include the three host instructions listed below.

Performance calculation instruction 1: Reads the current performance value (execution time) from a memory.

Performance calculation instruction 2: Adds the performance value of the target instruction.

Performance calculation instruction 3: Writes a result to the memory.

FIGS. 13A to 13C illustrate an exemplary relationship between an instruction in a target program and a number of host instructions in a host program.

The target program illustrated in FIG. 13A includes instructions i0, i1, and i2. Instruction i2 may be an externally dependent instruction, for example. In the converted host program illustrated in FIG. 13B, each of target instructions i0 and i1 has been converted to host code that includes one host instruction (function code) and three performance calculation instructions 1 to 3, a total of four instructions. Instruction i2 has been converted to code for performance simulation that includes function code (host instructions 1 and 2) and a performance calculation instruction (helper function).

In the host code corresponding to an instruction other than the externally dependent instruction, the number of performance calculation instructions for performance simulation is greater than the number of host instructions corresponding to the function of an instruction in the target program. Therefore, time taken to calculate performance becomes dominant in time taken to execute the performance simulation.

For example, the code converting part 11 of the simulation apparatus 1 illustrated in FIG. 1 detects, from the target code, an instruction of the type that uses the performance value of the previous instruction in performance calculation (the instruction will be referred to as the code generation source instruction) and generates host code (code for simulation) including a performance calculation instruction corresponding to the detected code generation source instruction. For instructions other than the code generation source instruction, performance values are recorded.

Code generation source instructions may include externally dependent instructions (LD instruction, ST (store) instruction, etc.) and performance information acquiring instructions (tsc register read instructions in the x86 and ARM cycle count register read instruction) which are provided according to the CPU architecture.

The code converting part 11 in the simulation apparatus 1 receives a user-specified measurement range (referred to below as the trace range) of the performance values of the target program, and generates code for performance simulation from instructions included in the trace range. The code converting part 11 detects a code generation source instruction from the instructions in the trace range and generates host code in which a performance calculation instruction has been embedded from the code generation source instruction.

The code converting part 11 of the simulation apparatus 1 holds information that indicates the user-specified trace range. The information indicating the trace trance range includes a start address and an end address of the range specified by the user by using a function, a target program, or a system call as a unit range.

The code converting part 11 receives a specified trace range before simulation is started or while simulation is being executed. The code converting part 11 holds the received trace range or updates the start address or end address of the trace range to be held.

The code converting part 11 holds a trace range in advance and receives a command for enabling a specification of the trace range by user's manipulation performed during simulation. The code generating part 115 disables the specification of the trace range to be held at the start of simulation. Upon receipt of a command to enable the specification of the trace range, the code generating part 115 enables the specification of the trace range and detects a code generation source instruction from the instructions included in the trace range.

For example, the code converting part 11 in the simulation apparatus 1 illustrated in FIG. 1 may perform code conversion processing that differs from the code conversion processing illustrated in FIG. 10. Processing different from the code conversion processing in FIG. 10 may be described. Other code processing and simulation processing may be substantially the same as or similar to the processing illustrated in FIGS. 11 to 13.

The code converting part 11 in the simulation apparatus 1 may hold detection information that identifies a code generation source instruction in advance. In the detection information, the type of instruction that becomes a generation source instruction is described.

If an externally dependent instruction or performance information acquiring instruction has been described in the detection information, the prediction simulation executing part 113 in the code converting part 11 detects a code generation source instruction from the blocks of the target program, which have been divided by the block dividing part 111, according to the detection information.

The code generating part 115 generates host code that includes host instructions (function code) generated by converting the functions of instructions other than the code generation source instruction and records the execution times (number of cycles) of the instructions.

The code generating part 115 generates a host instruction (function code), in which the function of the code generation source instruction has been converted, and host code including performance calculation instructions. The generated host code may include host instructions listed below, for example.

Performance calculation instruction 1: Reads the current performance value (execution time).

Performance calculation instruction 2: Adds the recorded performance values (execution times) of instructions i0 and i1, which are previous to instruction i2.

Performance calculation instruction 3: Updates the performance value.

Performance calculation instruction 4: Calls a helper function for instruction i2 and adds the execution time of instruction i2 to the performance value.

FIG. 14 illustrates an exemplary processing of a code converting part. The code conversion processing in FIG. 14 may be executed by the code converting part 11 in the simulation apparatus 1 in FIG. 1.

The block dividing part 111 in the code converting part 11 in the simulation apparatus 1 divides the code of a target program (target code) into prescribed blocks and inputs the divided blocks (operation S31). The prediction simulation executing part 113 analyzes the instructions in each block and detects a code generation source instruction (operation S32). The code generating part 115 generates host code in which a performance calculation instruction has been embedded from the detected code generation source instruction (operation S33).

If the code converting part 11 in the simulation apparatus 1 has held a start address and an end address that indicate the specification of a trace range, the prediction simulation executing part 113 in the code converting part 11 detects the start address from the blocks of the target program, which have been divided by the block dividing part 111, according to the specification of the trace range.

After having detected the start address, the prediction simulation executing part 113 continues to detect a code generation source instruction from the blocks of the target program according to the detection information until the prediction simulation executing part 113 detects the end address of the trace range.

The code generating part 115 generates a host instruction (function code) in which the function of an instruction other than the code generation source instruction has been converted, and records the execution time of the instruction. The code generating part 115 generates host code that includes performance calculation instructions and a host instruction (function code), in which the function of the code generation source instruction has been converted.

FIG. 15 illustrates an exemplary process of a code converting part. The code conversion processing in FIG. 15 may be executed by the code converting part 11 in the simulation apparatus 1 in FIG. 1.

The block dividing part 111 in the code converting part 11 in the simulation apparatus 1 divides the code of a target program (target code) into prescribed blocks and inputs the divided blocks (operation S41).

The prediction simulation executing part 113 analyzes the blocks and detects the start address or end address of the trace range (operation S42).

Operations S43 and S44 may be repeated from when the start address has been detected until the end address is detected.

The prediction simulation executing part 113 analyzes the instructions in each block and detects a code generation source instruction (operation S43). The code generating part 115 generates host code in which a performance calculation instruction has been embedded into the detected code generation source instruction (operation S44).

In the simulation apparatus 1, a generation of host instructions for performance value calculation for some instructions in the target program may be omitted. Accordingly, the number of host instructions used for simulation may be reduced and simulation time may be reduced.

Since the generation of host instructions for performance value calculation in code conversion processing is omitted, simulation speed may be improved while the precision of obtained performance values is maintained.

Since the performance of the target program is measured in the user-specified trace range during simulation, effective simulation is executed and simulation time is reduced.

The setting of the user-specified trace range may be applied to the code conversion processing illustrated in FIG. 10. The prediction simulation executing part 113 analyzes blocks and detects the start address or end address of the trace range between operations S1 and S2 in FIG. 10. Operations S2 to S5 may be executed in the trace range.

Figure 16:
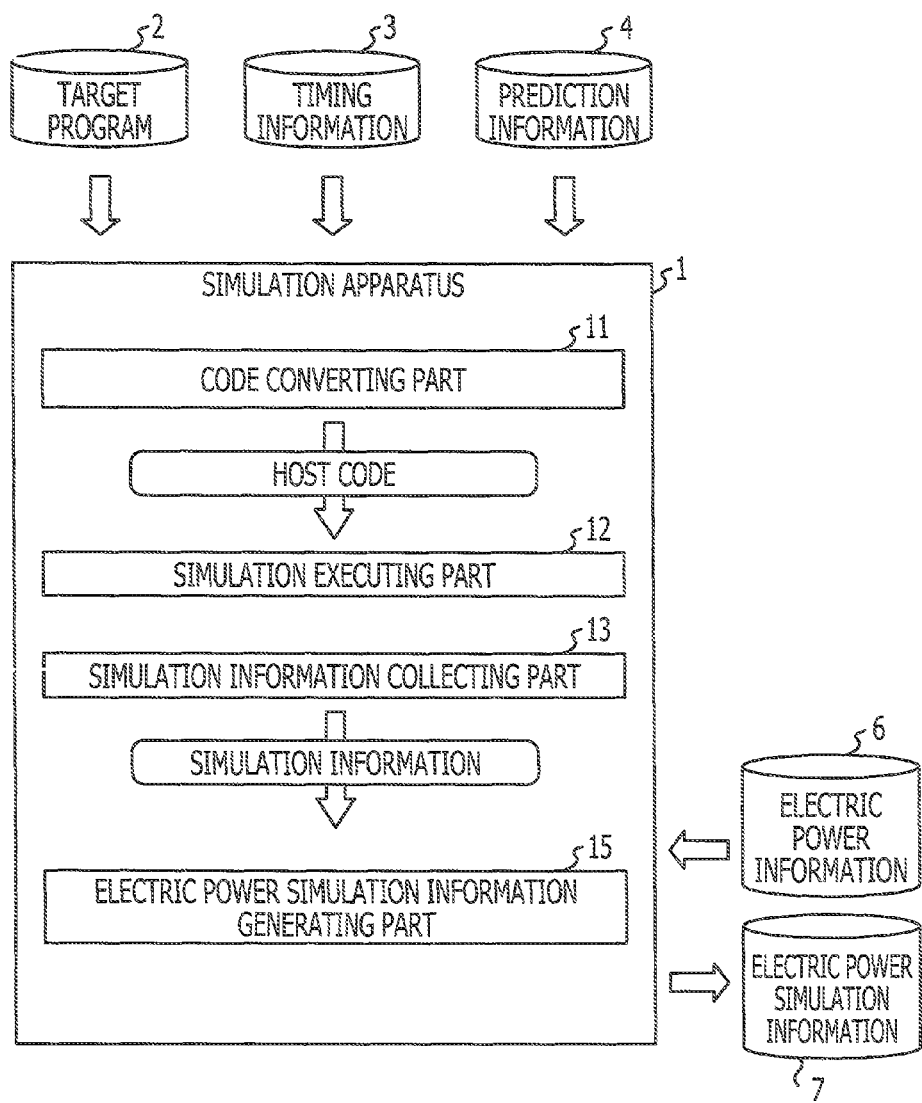
FIG. 16 illustrates an exemplary simulation apparatus.

FIG. 16 illustrates an exemplary simulation apparatus,

The simulation apparatus 1 includes an electric power simulation information generating part 15 besides the structure illustrated in FIG. 1.

The electric power simulation information generating part 15 calculates power consumed during block execution based on electric power information 6 and the simulation information 5 obtained from the simulation information collecting part 13, and outputs electric power simulation information 7.

Figure 17:
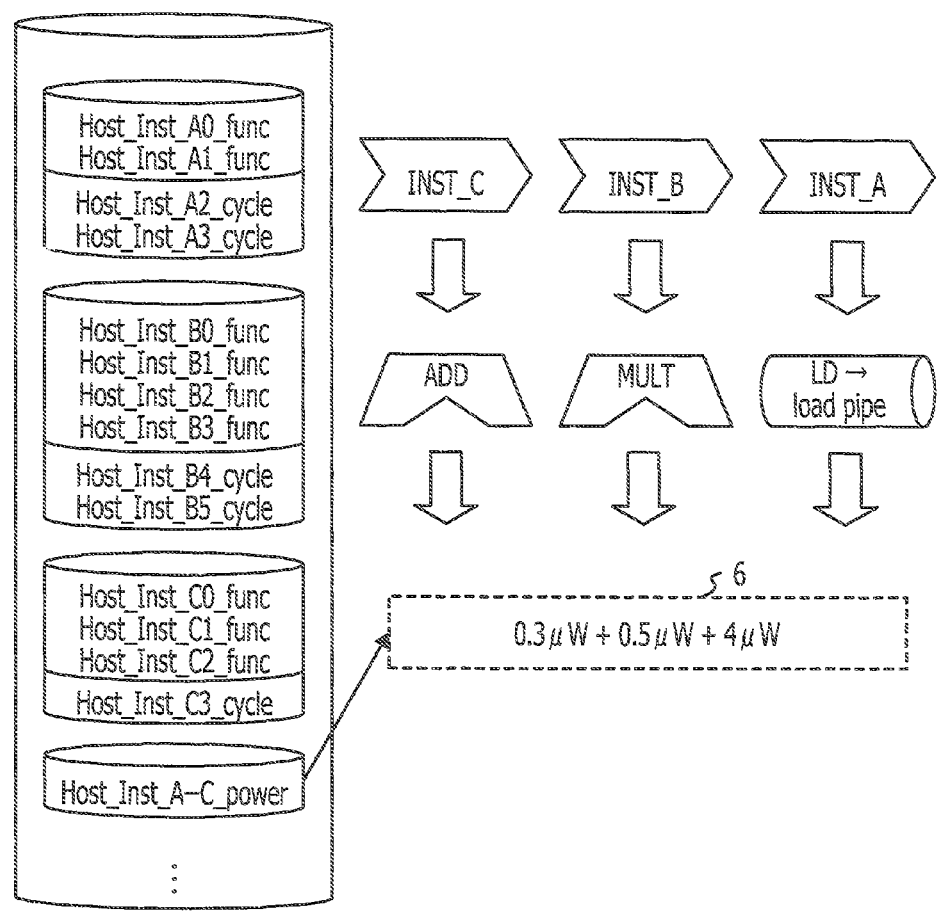
FIG. 17 illustrates an exemplary process of an electric power simulation information generating part.

FIG. 17 illustrates an exemplary processing of an electric power simulation information generating part. In FIG. 17, the electric power simulation information generating part 15 is executed as an electric power simulation function that is embedded into host code for performance simulation.

Electric power consumed by one execution of the LD instruction, MULT instruction, and ADD instruction in the electric power information 6 may be 4 µW, 0.5 µW, and 0.3 µW, respectively.

An electric power simulation function Host_Inst_A-C_power calculates electric power according to the number of times each instruction has been executed in simulation.

The simulation apparatus 1 illustrated in FIG. 1 may include an input device (including a keyboard and a mouse), an output device (such as a display unit or a printer), and a personal computer (PC), which has a computing unit (CPU), a temporary storage device (such as a dynamic random access memory (DRAM) or a flash memory), a persistent storage unit (such as a hard disk drive (HDD) or a flash memory), and a network interface coupled to a network N.

The simulation apparatus 1 executes PC-executable programs. A program in which processing of functions provided by the simulation apparatus 1 is coded is supplied to the simulation apparatus 1. The PC executes the supplied program to carry out simulation.

The PC may read a program from a transportable storage medium and may execute processing of the program. Alternatively, the PC may receive a program transferred from a server computer, and each time the PC receive a program, the PC may execute processing of the received program.

The program may have been recorded on a storage medium readable by the PC,

The simulation apparatus 1 illustrated in FIG. 1 carries out high-speed performance simulation of instructions of the CPU that controls pipeline processing.

In code conversion processing of a program of the target CPU by the code converting part 11 in the simulation apparatus 1, function simulation in which an execution result of an externally dependent instruction is predicted (predictive case) for each divided block is executed as in the JIT compiler method, and the execution time of each instruction is represented as a constant according to the timing information 3.

The code converting part 11 of the simulation apparatus 1 embeds code for correcting the execution times of instructions in a predictive case into the host code instead of embedding, into the host code, simulation execution code for obtaining performance simulation information (cycle simulation information) about execution in other than a predictive case.

The simulation executing part 12 in the simulation apparatus 1 carries out performance simulation for instructions in a predictive case. Instead of simulation for an instruction in a non-predictive case, the execution time in the predictive case is corrected according to, for example, the delay time of the instruction in the non-predictive case or the execution times of the instructions executed before and after the instruction.

Less code used for simulation is added to the function code, the load in performance simulation processing is reduced, and processing is carried out at high speed.

The simulation apparatus 1 carries out function simulation based on a predictive case. Since the execution time of each instruction in one case (predictive case) is obtained through static analysis processing, the execution time of an instruction in a case other than the predictive case is corrected by addition or subtraction of, for example, a penalty time for the execution time in the predictive case, the execution times of the instructions executed before and after the execution, or the delay time of the preceding instruction.

The simulation apparatus 1 simulates the performance or electric power of a system including the CPU at high speed, so the performance or electric power of an entire large-scale system may be easily evaluated, analyzed, or predicted.

The simulation apparatus 1 precisely simulates the power consumption of a program at high speed according to the electric power information and performance simulation information.

Since performance simulation is not carried out in each case, the load in performance simulation processing is reduced and simulation is carried out with high precision.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A simulation apparatus comprising:
   a code converting part; and
   a simulation executing part,
   wherein the code converting part performs:
      dividing code of a program in a target processor which is controlled by a host processor into blocks;
      setting an execution result of an externally dependent instruction depending on an external environment included in a block as a prediction result;
      carrying out function simulation based on the prediction result;
      calculating an execution time of the externally dependent instruction under the prediction result according to instruction execution timing information included in the block and a function simulation result; and
      generating host code which makes the host processor execute performance simulation under the prediction result based on the function simulation result, and
   wherein the simulation executing part performs:
      correcting the execution time of the externally dependent instruction by using a correction value based on a delay time of the externally dependent instruction and an execution time of an instruction executed before or after the externally dependent function if an execution result of the externally dependent function when the host processor executes the host code differs from the prediction result; and
      setting the corrected execution time of the externally dependent instruction as the execution time of the externally dependent instruction,
      wherein the simulation executing part detects, from the instructions included in the block, an instruction that uses an execution time of an immediately preceding instruction for a calculation of an execution time of the detected instruction, and generates the host code including a host instruction that calculates the execution time of the detected instruction.

2. The simulation apparatus according to claim 1, wherein the target processor controls pipeline processing.

3. The simulation apparatus according to claim 1, wherein the simulation executing part uses an execution time of a next instruction to be executed following the externally dependent instruction as the correction value when the execution time of the next instruction does not exceed the delay time of the externally dependent instruction.

4. The simulation apparatus according to claim 3, wherein the simulation executing part subtracts the correction value from the delay time of the externally dependent instruction.

5. The simulation apparatus according to claim 1, further comprising,
   an electric power simulation information generating part to obtain electric power simulation information including electric power consumed by an instruction in the host code and the function simulation result.

6. A simulation method comprising:
   executing by a computer processor operations of:
      dividing code of a program in a target processor which is controlled by a host processor into blocks;
      setting an execution result of an externally dependent instruction depending on an external environment included in a block as a prediction result;
      carrying out function simulation based on the prediction result;
      calculating an execution time of the externally dependent instruction under the prediction result according to instruction execution timing information included in the block and a function simulation result;
      generating host code which makes the host processor execute performance simulation under the prediction result based on the function simulation result;
      correcting the execution time of the externally dependent instruction by using a correction value based on a delay time of the externally dependent instruction and an execution time of an instruction executed before or after the externally dependent function if an execution result of the externally dependent function when the host processor executes the host code differs from the prediction result;

setting the corrected execution time of the externally dependent instruction as the execution time of the externally dependent instruction;

detecting, from the instructions included in the block, an instruction that uses an execution time of an immediately preceding instruction for a calculation of an execution time of the detected instruction; and generating the host code including a host instruction that calculates the execution time of the detected instruction.

7. The simulation method according to claim 6, wherein the target processor controls pipeline processing.

8. The simulation method according to claim 6, further comprising, using an execution time of a next instruction to be executed following the externally dependent instruction as the correction value when the execution time of the next instruction does not exceed the delay time of the externally dependent instruction.

9. The simulation method according to claim 8, further comprising, subtracting from the delay time of the externally dependent instruction to obtain the correction value.

* * * * *